Aug. 23, 1960

G. BARBERIS 2,950,047

CHANGE INDICATING DEVICE

Filed Feb. 9, 1954

10 Sheets-Sheet 1

INVENTOR.

GIOVANNI BARBERIS

BY Young, Emery & Thompson

Attys.

Aug. 23, 1960 G. BARBERIS 2,950,047

CHANGE INDICATING DEVICE

Filed Feb. 9, 1954 10 Sheets-Sheet 2

INVENTOR.
GIOVANNI BARBERIS
BY Young, Emery & Thompson
Attys.

Aug. 23, 1960 G. BARBERIS 2,950,047

CHANGE INDICATING DEVICE

Filed Feb. 9, 1954 10 Sheets-Sheet 3

INVENTOR.
GIOVANNI BARBERIS
BY Young, Emery & Thompson
Attys.

Aug. 23, 1960 G. BARBERIS 2,950,047

CHANGE INDICATING DEVICE

Filed Feb. 9, 1954 10 Sheets-Sheet 4

INVENTOR.
GIOVANNI BARBERIS
BY Young, Emery & Thompson
Attys.

INVENTOR.
GIOVANNI BARBERIS
BY Young, Emery & Thompson
ATTYS.

INVENTOR.
GIOVANNI BARBERIS
BY Young, Emery & Thompson
Attys.

INVENTOR.
GIOVANNI BARBERIS
BY Young, Emery & Thompson
Attys.

INVENTOR.
GIOVANNI BARBERIS
BY Young, Emery & Thompson
Att'ys.

Aug. 23, 1960 G. BARBERIS 2,950,047
CHANGE INDICATING DEVICE
Filed Feb. 9, 1954 10 Sheets-Sheet 9

INVENTOR.
GIOVANNI BARBERIS
BY Young, Emery & Thompson
Attys.

Aug. 23, 1960

G. BARBERIS 2,950,047

CHANGE INDICATING DEVICE

Filed Feb. 9, 1954

10 Sheets-Sheet 10

INVENTOR.
GIOVANNI BARBERIS
BY Young, Emery & Thompson
Attys.

United States Patent Office 2,950,047
Patented Aug. 23, 1960

2,950,047

CHANGE INDICATING DEVICE

Giovanni Barberis, Turin, Italy, assignor to Riv Officine di Villar Perosa Societa per Azioni, Turin, Italy Filed Feb. 9, 1954, Ser. No. 409,194
Claims priority, application Italy May 25, 1948
5 Claims. (Cl. 235—7)

This application is a continuation-in-part of patent application Serial No. 254,476 filed on November 2, 1951, now abandoned, which was a continuation-in-part of patent application Serial No. 93,714 filed on May 17, 1949, now abandoned, and relates to a device adapted to indicate the amount to be returned to a customer who tenders payment by a coin or banknote exceeding the value of the article to be purchased, and that is registered on the cash register.

The problem of calculating the change which has to be returned to a purchaser is not solved by any of the known cash registers. In ordinary practice, the change is calculated mentally, with pencil and paper, or by a normal calculating machine which is separate from the cash register.

The problem of calculating the change is a different and simpler problem than the problem of effecting a normal subtraction. In the normal subtraction, there is any desired first number *a*, from which any desired second number *b* must be subtracted, while on calculating the change, the number *a* is not any number whatever, but is limited to predetermined values corresponding to the values of the currency, there being six values in the Italian currency, 10,000—5,000—1,000—500—100—50. A common property of the values of currency, which is not limited to Italian currency only, is that all the different values are formed by 1 or 5 followed by a variable number of zeros. The change-calculating device according to the present invention is based on this observation.

An object of this invention is to provide an apparatus which is arranged on a cash register and which, after the normal operative cycle of the cash register is effected, may be set by the operator to the value of the note tendered by the purchaser and will then indicate the value of the change which must be returned to the purchaser.

A further object of the invention is to provide a device operatively connected with a cash register, particularly with the front reading drums of the cash register carrying the set figures of said cash register, and comprising a setting device with keys corresponding to the values of the currency (six in the Italian currency) and an indicating member for certain complements with respect to the values carried by said setting device.

A further object of this invention is to provide a cash register having a set of change-indicating drums, means for transmitting movement of the front reading drums of the cash register to the change-indicating drums, a shaft carrying said set of change-indicating drums, means for transmitting the movement to said change-indicating drums from the reading drums of the values set in said cash register, a second shaft carrying a series of transfer sectors, said sectors being operatively connected with the change-indicating drums, a third shaft, and a set of feelers mounted on said third shaft to engage said transfer sectors on being operated.

The device according to the invention is formed by a set of drums corresponding to the columns of the cash register, the right-hand drum having engraved therein the complements to ten of the last column of the values set, while the further drums have engraved therein two columns, that is a column of the complements to ten and a column of the complements to five.

A further object of the invention is the combination with the change-indicating drums of a set of opening members for the openings through which the change-indicating drums appear, said opening members uncovering only the particular columns of the drums on which the figures corresponding to the complement to a particular coin appear. The necessity for said opening members arises from the fact that the change-indicating drums show in a column the complements to ten and in the next column the complements to five. It is consequently necessary, in order to read on the drums the complement to the coin set, to provide opening members which can show only the column involved in the complement, otherwise the figures appearing on the drum will be meaningless.

The indication of the change-indicating drums takes place in three successive steps, which are effected by the setting device and the prime mover of the cash register. The three steps are as follows:

*a.* setting on the change-indicating drums of the complements to ten and five of the figures of the cashed amount, this setting being effected by the setting device of the cash register;

*b.* return through one step of the change-indicating drums except the extreme right-hand drum carrying the units, said return being effected by the prime mover of the cash register;

*c.* return to the position indicated under *a* of the drum corresponding to the first significant figure, and the drums to the right thereof, this return being effected by the prime mover of the cash register.

By way of example the value of the amount paid and carried on the cash register is 4 7 0

Figures are indicated which appear at predetermined positions corresponding to the reading openings of the change-indicating drums after the operation previously indicated under *a*, *b*, *c*, for the columns corresponding to possible currency paid (that is in the present case 500—1000—5000—10000). The change-indicating drums corresponding to the units, tens, hundreds, thousands, are indicated as first, second, third, fourth drum respectively. The change is indicated in different columns according to the coin set. Said columns are:

I. coin 500:
column of the complements to 5 in the third drum
column of the complements to 10 in the second drum
column of the complements to 10 in the first drum II. coin 1000:
column of the complements to 10 in the third drum
column of the complements to 10 in the second drum
column of the complements to 10 in the first drum III. coin 5000:
column of the complements to 5 in the fourth drum
column of the complements to 10 in the third drum
column of the complements to 10 in the second drum
column of the complements to 10 in the first drum IV. coin 10000:
column of the complements to 10 in the fourth drum
column of the complements to 10 in the third drum
column of the complements to 10 in the second drum
column of the complements to 10 in the first drum The figures which appear on the change-indicating drums at the positions corresponding to the reading openings after step *a*, which takes place at the same time as the setting operation of the cash register, are for a 500—1000—5000—10,000 note, respectively, 130 630 5630 0630 which are *not* the changes to be returned. At the step *b*, the figures which appear on the change-indicating drums are 020 520 4520 9520 and at the end of step *c*, the figures which appear on the change-indicating drums are 030 530 4530 9530 which indicate the changes that must be returned to a purchaser who has tendered payment by 500, 1000, 5000, 10,000 notes, respectively.

By way of a further example, the value of the amount paid and carried on the cash register is

765

The coins paid can be 1000—5000—10,000, the corresponding change appearing in the columns previously indicated under II—III—IV.

The figures which appear at the positions corresponding to the reading openings are

| | | | |
|---|---|---|---|
| after step *a* | 3 4 5 | 5 3 4 5 | 0 3 4 5 |
| after step *b* | 2 3 5 | 4 2 3 5 | 9 2 3 5 |
| after step *c* | 2 3 5 | 4 2 3 5 | 9 2 3 5 |

which indicate the change that should be returned to a purchaser who has tendered payment by 1000, 5000, 10,000 notes, respectively.

As a last example, the value of the amount paid and carried on the cash register is

3300

The coin paid can be 5000 and 10,000; the corresponding change appears in the column previously indicated under III and IV.

The figures which appear at the position corresponding to the reading openings are:

| | | |
|---|---|---|
| after step *a* | 2 7 0 0 | 7 7 0 0 |
| after step *b* | 1 6 9 0 | 6 6 9 0 |
| after step *c* | 1 7 0 0 | 6 7 0 0 |

The three successive steps take place in the machine in the following manner:

*a*. During the setting operation the drums of the cash register carry along in rotation the corresponding drums of the change-calculating device, thereby effecting the indication of the individual figures corresponding to the complements of the figures of the amount paid.

*b*. A set of transfer sectors equalling in number the indicating drums less one returns through one step the drums of the change-calculating device, except the extreme right-hand drum corresponding to the lowest value.

*c*. The member driving the sectors-operating return of the drums through one step returns to its starting position. Return of the sectors after the sector on which the first figure other than zero appears is prevented.

The apparatus disclosing the openings through which the figures of the change appear is operated by the attendant at the end of the step indicated under *c*. Said apparatus are formed by a set of screens operated by the key corresponding to the value set.

A change-calculating device adapted for use with a cash register capable of setting figures up to 9999 will now be described by way of example with reference to the enclosed drawings. It will be obvious that the capacity indicated above is in no way a limit, for the device can meet any setting capacity of the cash register by adding further similar elements of the change-calculating device.

Figures 5, 6A, 6B, 6C:
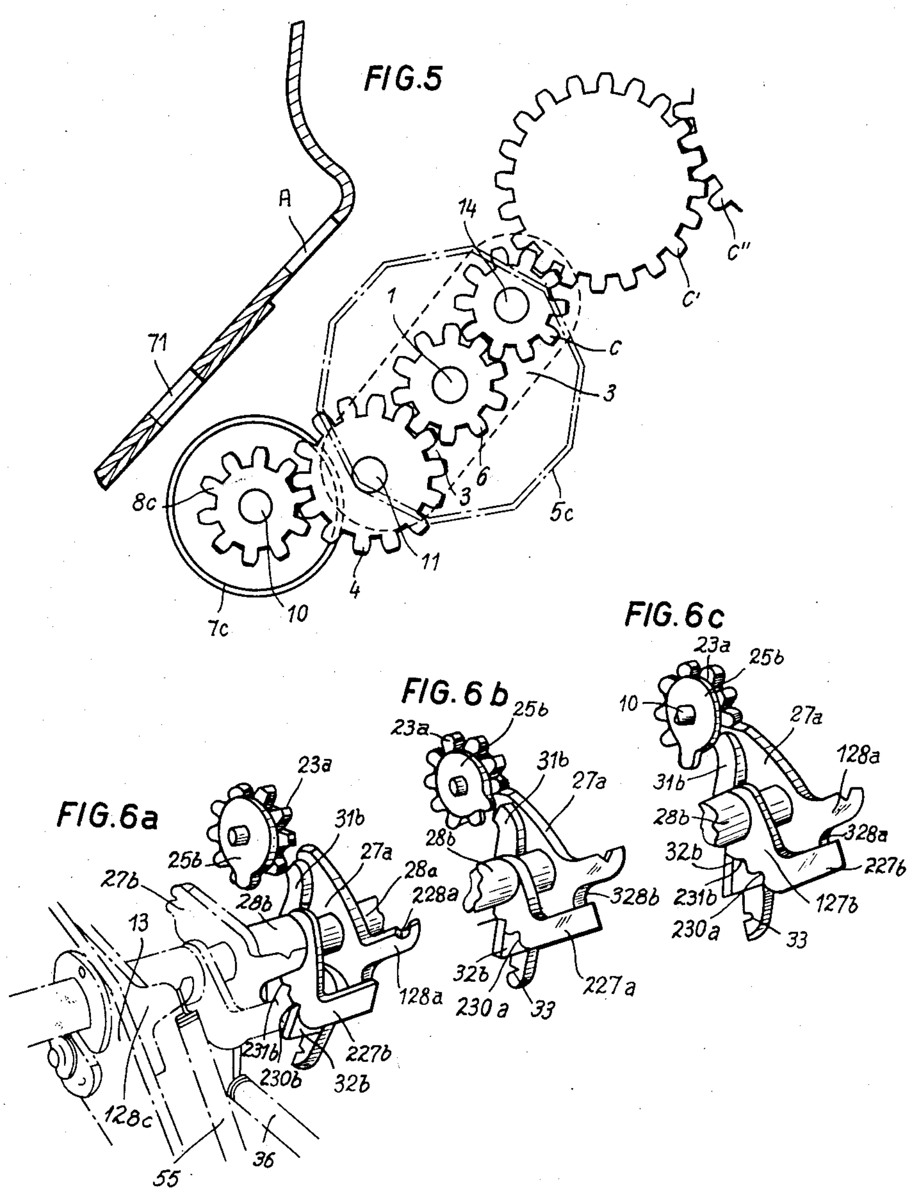
Fig. 5 shows the transmission system actuating the change-indicating drums operated by the setting levers of the cash register.
Figure 7A:
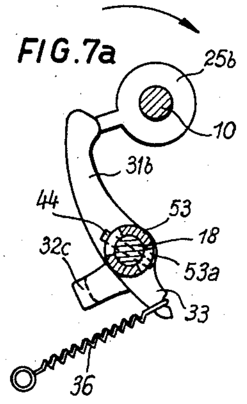
Figure 7B:
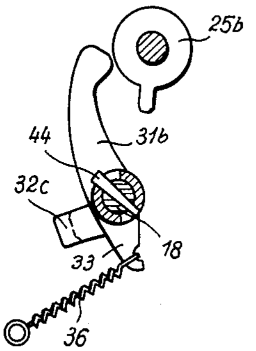
Figure 8A:
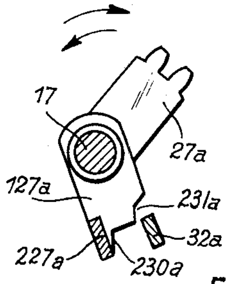
Figure 8B:
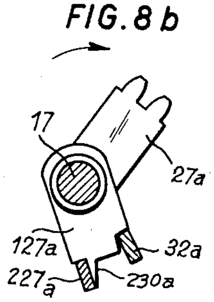
Figure 24:
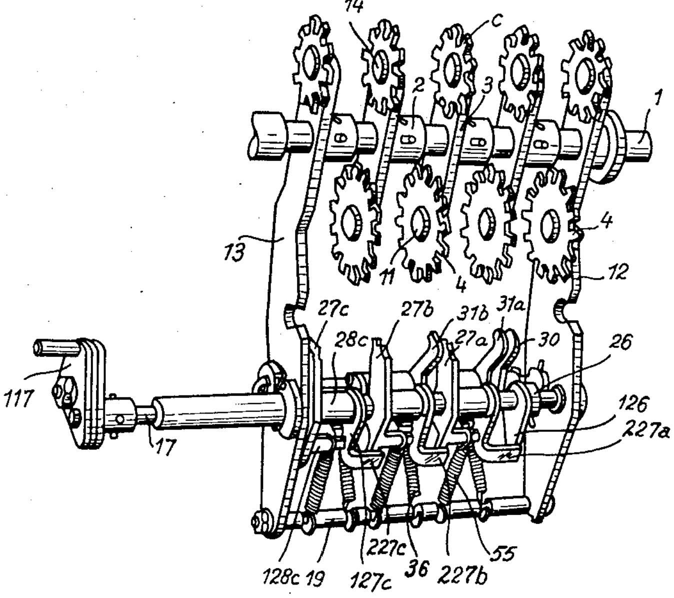
Figure 9:
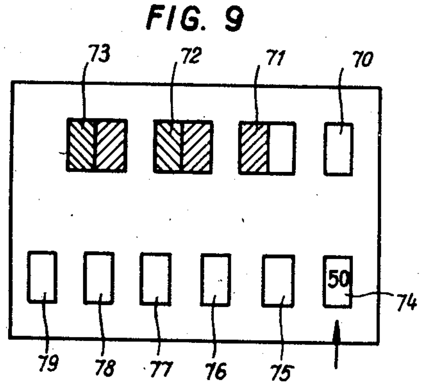
Figure 12:
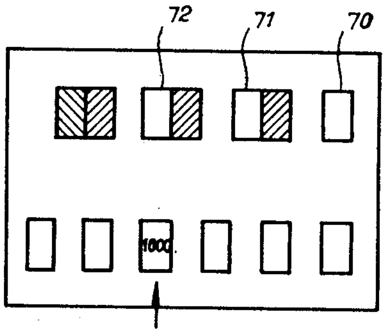
Figure 10:
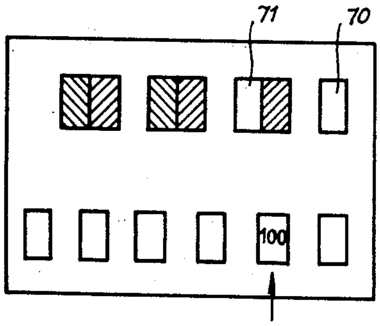
Figure 13:
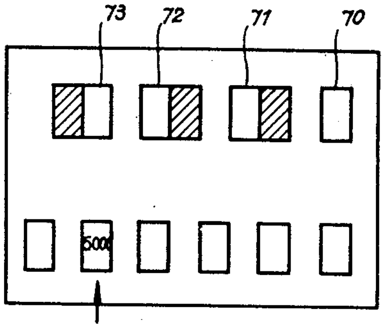
Figure 11:
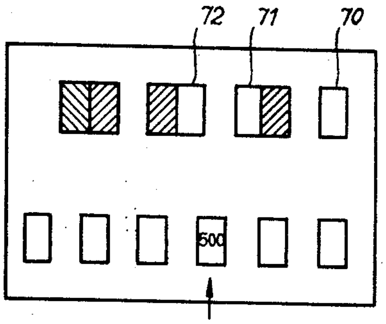
Figure 14:
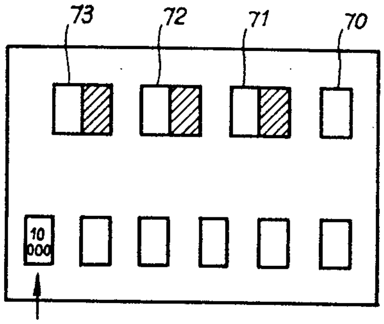
Figure 15:
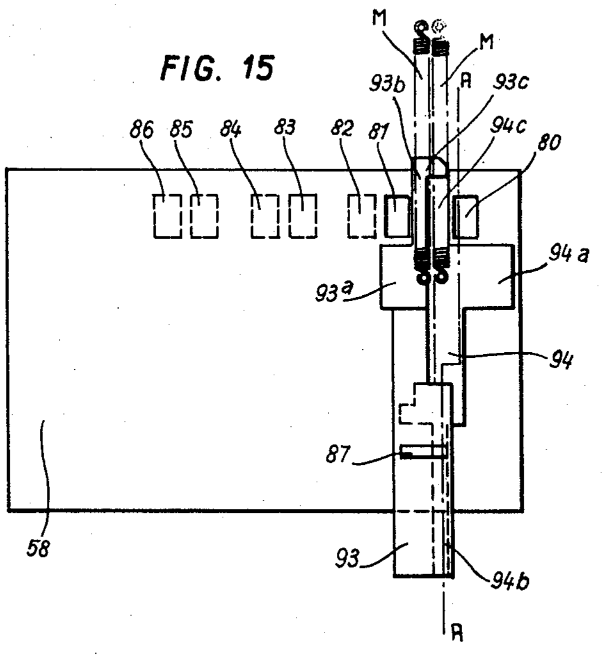
Figure 15A:
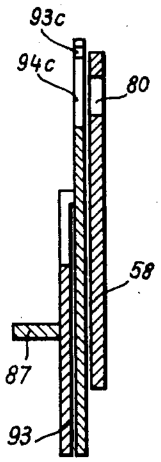
Figure 16:
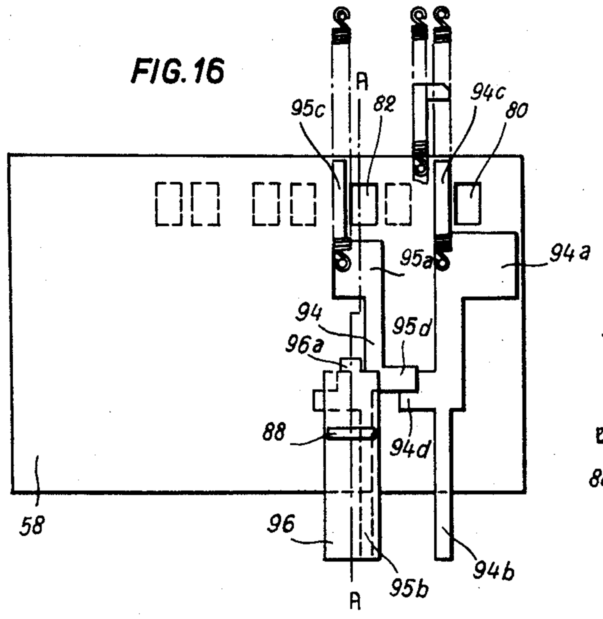
Figure 16A:
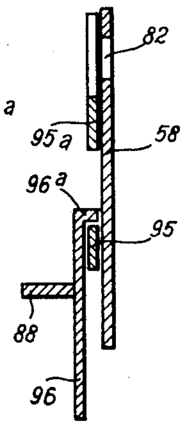
Figure 17:
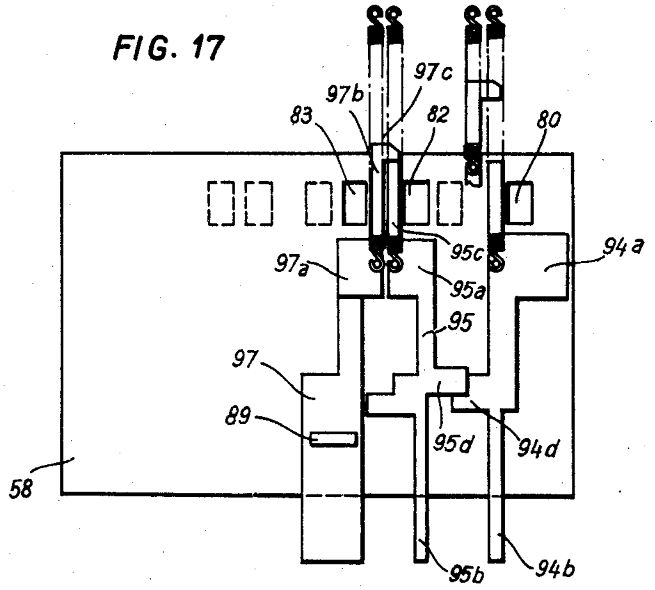
Figure 18:
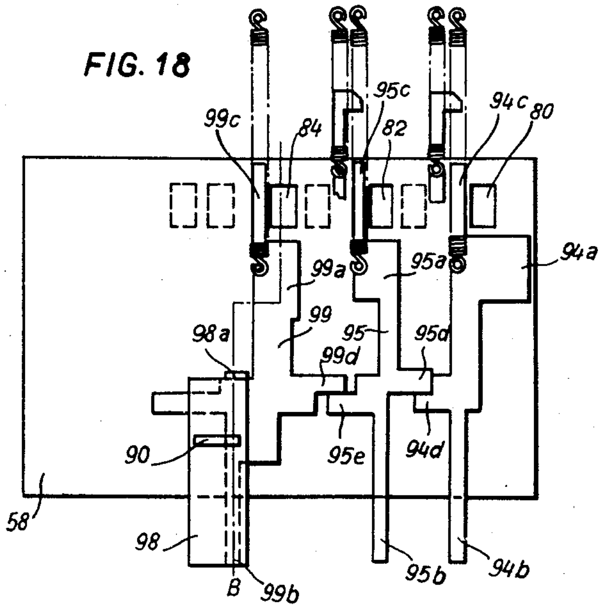
Figure 18A:
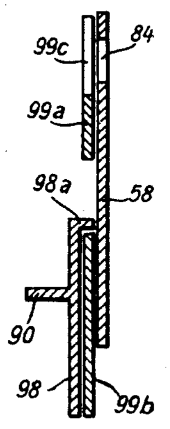
Figure 19:
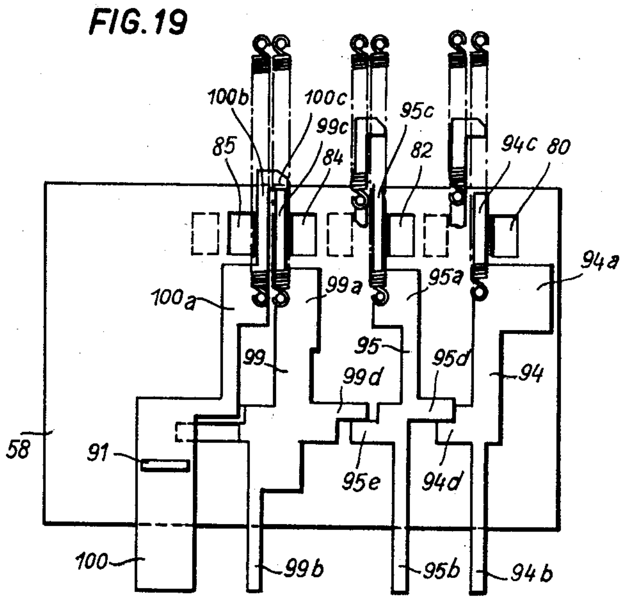
Figure 20:
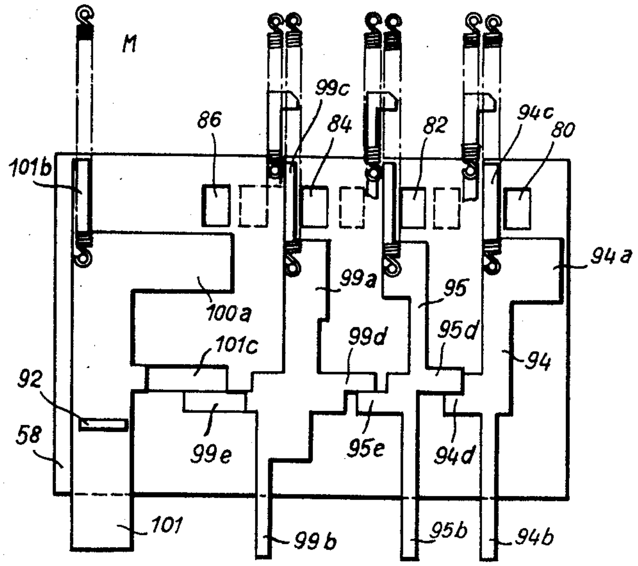
Figure 21A:
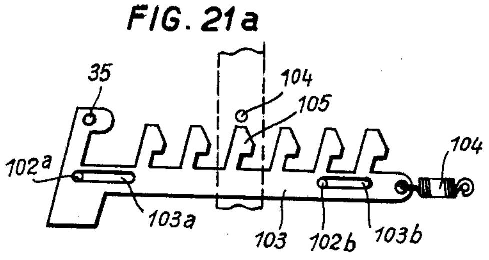
Figure 21B:
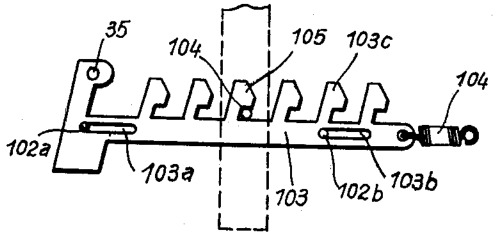
Figure 22:
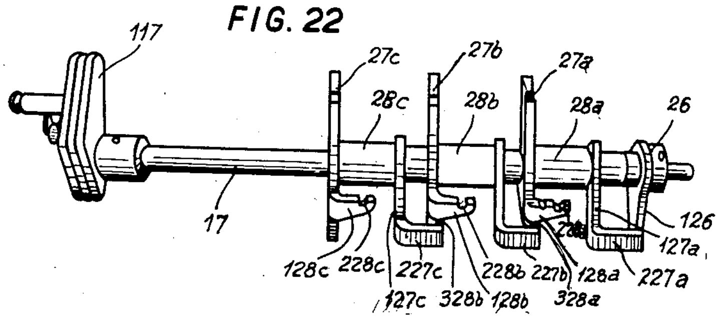
Figure 23:
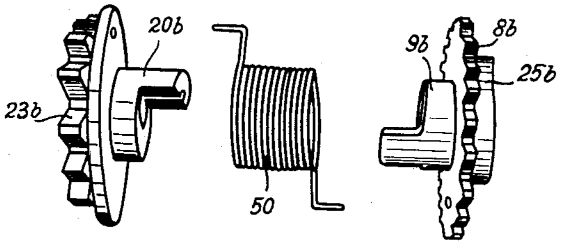

Figs. 6*a*, 6*b* and 6*c* show three different perspective views of the transfer sector, feeler member, and means for actuating return of the change-indicating drums;

Figs. 7*a* and 7*b* show in section two different positions of the feeler members;

Figs. 8*a* and 8*b* show in section two different positions of the transfer sector and feeler member;

Figs 9 to 14 show diagrammatically the combination of the openings in order to show the change on the indicating drums for each particular coin;

Figs. 15 to 20 show operation of the members actuating the screens covering the change-indicating drums for each particular coin or banknote set;

Figs. 15*a*, 16*a* and 18*a* are cross sections of Figs. 15, 16 and 18 on lines AA and BB respectively;

Figs. 21*a* and 21*b* are detail views of the machine in two different positions;

Fig. 22 is a detail view of the machine, part of the elements being removed for the sake of clearness;

Fig. 23 is a detail view of the resilient connection for the movement of the change-indicating drums;

Fig. 24 is a detail view of the machine; and

Figure 25:
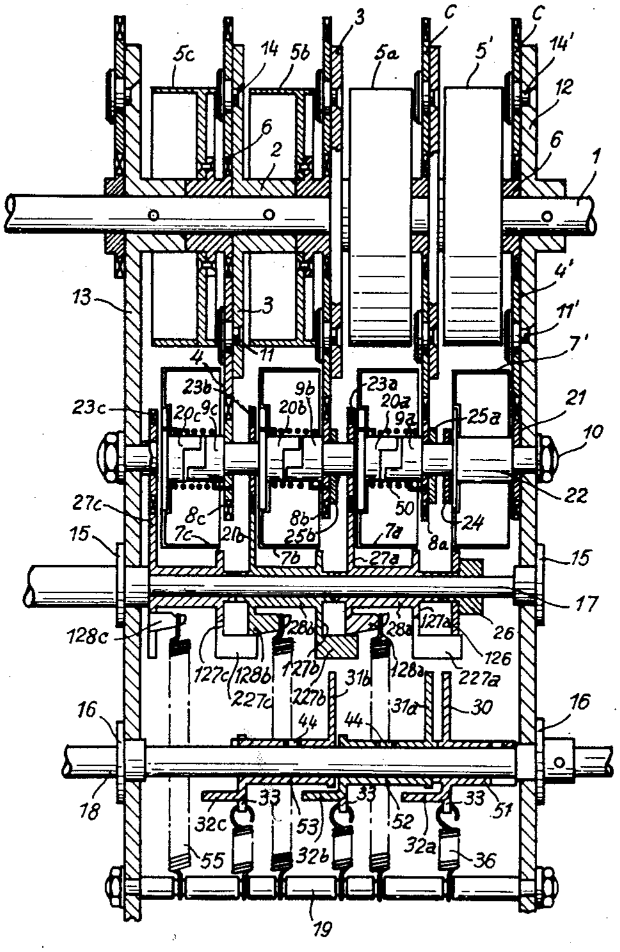

Fig. 25 is a conventional view of the machine, the spacing between the different shafts having been increased for the sake of clearness.

The change-calculating device is mounted between two side walls 12, 13 (Figs. 3 and 25) on which the following shafts are arranged:

(1) shaft of the front-indicating drums 1
(2) shaft for the change-indicating drums 10
(3) transfer shaft 17
(4) transfer-engaging shaft 18.

The four shafts and devices mounted thereon are separately described.

*Shaft for the front-indicating drums (Figs. 3, 25)*

1 denotes the shaft for the front reading drums of the change-calculating device, said shaft being secured to the two side walls 12, 13 of the change-calculating device. Each drum 5′, 5*a*, 5*b*, 5*c* for the units, tens, hundreds and thousands, respectively (Fig. 25), indicates a figure of the amount set and is rotated on the shaft 1 by the corresponding gear 6′, 6 (three in number) secured to the drums 5′ and 5*a*, 5*b*, 5*c*, respectively.

Figure 1:
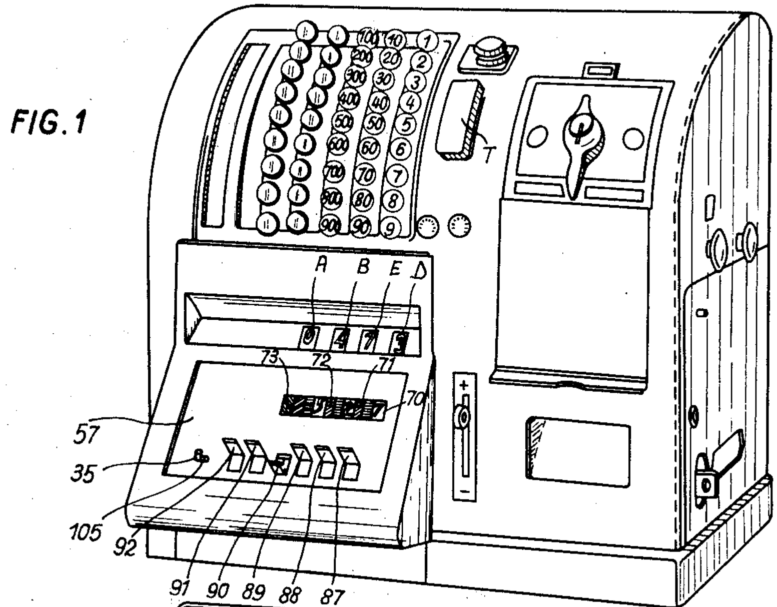
Fig. 1 is a perspective view of the cash register having mounted thereon the change-calculating device.

The amount set may be read thereon on the indicating drums 5*c*, 5*b*, 5*a*, 5′ through openings A, B, E, D (Fig. 1). The gears 6, 6′ driving the indicating drums 5*c*, 5*b*, 5*a*, 5′ are actuated by the setting levers of the cash register, not shown, through a set of gears *c*—*c*′—*c*″ (Fig. 5) for each drum.

Connection between one of the indicating drums 5*a*, 5*b*, 5*c*, and the corresponding change-indicating drum 7*a*, 7*b*, 7*c* is diagrammatically shown in Fig. 5. The drum 5*c* is secured to gear 6, which is actuated by the setting device of the cash register through the set of gears *c*—*c*′—*c*″ (Fig. 5), namely, a set of gears for each drum, and rotates the corresponding change-indicating drum 7*c* through gear 4 and gear 8*c*.

Gear C and gear 4 for each drum 5a, 5b, 5c are carried by a supporting member 3 (three in number, see Figs. 25 and 24) which is rigidly connected to the hub 2 (Fig. 3) splined to the shaft 1. Each supporting member 3 carries at one end a pivot 11, on which gear 4 rotates, and at the opposite end a pivot 14 on which the gear C rotates.

Rotation of one of the toothed wheels c', by way of example, the toothed wheel connected to the indicating drum 5c, rotates through the gear set c—6—4 the toothed wheel 8c connected to the change-indicating drum 7c.

The drum 5' (Fig. 25) indicating the units (right end drum) is rotated by a wheel c rotatable on the pivot 14' fixed to the side wall 12. The said wheel c rotates through the toothed wheel 6', fixed to the drum 5' and rotatable on the shaft 1, a toothed wheel 4' rotatable on a pivot 11' fixed to the side wall 12 of the change-indicating device. The toothed wheel 4' engages a toothed wheel 21 carried on the shaft 10 and rigidly connected with the change-indicating drum 7' for the units.

*Shaft of the change-indicating drums (Figs. 3 and 25)*

Shaft 10 (Figs. 3, 25) secured to the side walls 12, 13 of the change-indicating device carries the drum 7' of the right figure of the change and the drums 7a, 7b, 7c for the tens, hundreds, thousands, respectively. Drum 7' (Fig. 25), that is, the first drum on the right and near the side wall 12, is secured to a hub 22 rotatable on the shaft 10 and has fixed thereto a toothed wheel 21 meshing with toothed wheel 4', so that any angular displacement of drum 5' causes the drum 7' to rotate. Hub 22 has fixed thereto a one-tooth wheel 24.

The drums 7a, 7b, 7c mounted on the shaft 10 are fixed each to a hub 20a, 20b, 20c rotatably mounted on the shaft 10. Each hub 20a, 20b, 20c has secured thereto a toothed wheel 23a, 23b, 23c.

A second hub 9a, 9b, 9c is mounted on the shaft 10 for each drum 7a, 7b, 7c. Said hub 9a, 9b, 9c has fixed thereto the toothed wheel 8a, 8b, 8c (Figs. 3, 25) meshing with the corresponding toothed wheel 4. A one-tooth wheel 25a, 25b is fixed to hubs 9a, 9b, respectively; no toothed wheel is fixed to the left-hand hub 9c.

A resilient connection (Figs. 3, 23, 25) is provided between each hub 20a, 20b, 20c and the corresponding hub 9a, 9b, 9c. Said connection is effected through a torque spring 50, one end of which is fixed to the hub 9a, 9b, 9c while the opposite end is secured to the hub 20a, 20b, 20c.

The resilient connection between the hub 9a, 9b, 9c and hub 20a, 20b, 20c permits an independent angular displacement between the hubs 9a, 9b, 9c and corresponding hubs 20a, 20b, 20c.

During the setting operation, the hub 20a, 20b, 20c and, consequently, the drum 7a, 7b, 7c secured thereto performs an angular displacement equal to the angular displacement of the hub 9a, 9b, 9c driven by the setting device of the cash register through gears C''—C'—C—6—4—8a (8b, 8c). The resilient connection between the hubs 20a, 20b, 20c and 9a, 9b, 9c, respectively, admits of a rotation of hub 20a, 20b, 20c independently of any angular displacement of hub 9a, 9b, 9c during operation of the apparatus for indicating the change, as will be explained hereinafter.

Figure 4:
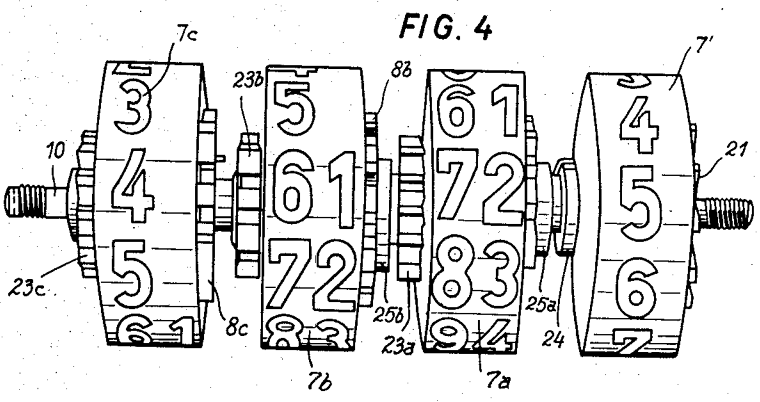
Fig. 4 shows the change-indicating drums, the three drums on the left being provided with two columns for the complement to ten and for the complement to five, respectively, and the right end drum showing only the column of the complement to ten.

The indicating drums 5', 5a, 5b, 5c have each engraved therein ten figures from 0 to 9. The change-indicating drum 7' (Fig. 4, right end drum) has engraved therein figures from 0 to 9, while the change-indicating drums 7a, 7b, 7c (Fig. 4) have engraved therein two columns of figures, the left-hand column comprising figures from 0 to 9 and the right-hand column comprising figures from 1 to 5, the two columns in each drum 7a, 7b, 7c being arranged so that the difference between the left- and right-hand column is constantly 5. Drums 5a, 5b, 5c and 7a, 7b, 7c are so arranged that, during the setting operation, the figures which appear on drums 7a, 7b, 7c, 7' in the position corresponding to the openings of the apparatus through which the change will be read are the complements to ten and five, respectively, of the figures set by the setting device on the indicating drums 5a, 5b, 5c, 5'.

*Transfer shaft (Figs. 22–25)*

The transfer shaft has mounted thereon the means for rotating through an angle corresponding to one step the change-indicating drums 7a, 7b, 7c. Said rotation is effected at the step indicated as step b of the change-calculating operation.

The transfer shaft 17 (Figs. 3, 25) is rotatably mounted on two bearings 15 fixed to the side walls 12, 13 and is rotated in both directions by the prime mover of the cash register through transmission means, not shown in the drawings for the sake of simplicity, and ending at the crank 117 (Figs. 22, 24) secured at one end of the shaft 17. The rotation of the transfer shaft 17 takes place after the setting operation on the cash register, while the prime mover of said cash register effects the registering and carrying operation of the amount cashed.

Three hubs 28a, 28b, 28c (Figs. 24, 25) are rotatably mounted on the shaft 17, the number of said hubs equalling the number of the change-indicating drums 7a, 7b, 7c. Each of said hubs has fixed thereto a toothed sector 27a, 27b, 27c (Figs. 8, 6, 22), the toothed end of which can mesh with the toothed wheel 23a, 23b, 23c fixed to the hub 20a, 20b, 20c of each drum 7a, 7b, 7c. During the setting operation, the toothed sector 27a, 27b, 27c does not mesh with said toothed wheel 23a, 23b, 23c (Fig. 6a).

Figure 3:
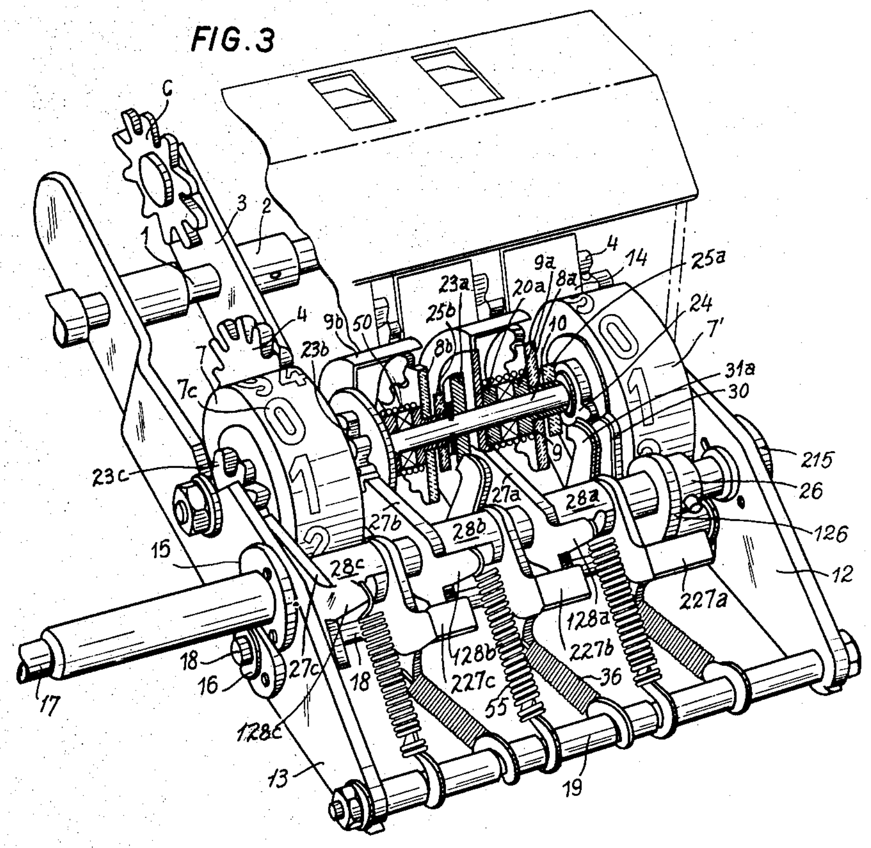
Fig. 3 is a part sectional view of the change-calculating device, the front part being removed for the sake of clearness.

A projection 128a, 128b, 128c (Figs. 22, 24, 25) is fixed to each toothed sector 27a, 27b, 27c (Fig. 22), said projection being formed with a recess 228a, 228b, 228c (Fig. 22) to which one end of a spring 55 (three in number) is fixed, the other end of said spring being fixed to a shaft 19 (Figs. 3, 25). The spring 55 operates to disengage the toothed sector 27a, 27b, 27c from the corresponding toothed wheel 23a, 23b, 23c of the corresponding change-indicating drum 7a, 7b, 7c.

Each hub 28a, 28b, 28c has secured thereto a member 127a, 127b, 127c (Fig. 22) provided with an L-shaped projection 227a, 227b, 227c (Figs. 6, 22, 25). The projections 227c and 227b secured to the hubs 28c and 28b, respectively, cooperate with the ends 328b and 328a of the toothed sectors 27b and 27a secured to the hubs 28b and 28a, respectively. The projection 227a on the hub 28a cooperates with a member 126 fixed on a hub 26 keyed to the shaft 17.

The members 127a, 127b, 127c are formed at their lower ends (Figs. 6, 8, 22) with two notches 230a, 230b, 230c and 231a, 231b, 231c which cooperate with feeler members mounted on the shaft 18 in the manner which will be hereinafter explained.

A hub 26 (Figs. 22, 24, 25) is fixed to the end of the shaft 17. Said hub is provided with a projection 126 which engages the projection 227a on the member 127a fixed to the hub 28a.

The shaft 17 is rotated by the prime mover of the cash register, after the end of the setting operation, in the direction of the upper arrow of Fig. 8a to being the sectors 27a, 27b, 27c into engagement with the corresponding toothed wheels 23a, 23b, 23c. The engagement between toothed sectors 27a, 27b, 27c and the corresponding toothed wheels 23a, 23b, 23c is effected in the following manner: rotation of the shaft 17 in the direction of the upper arrow of Fig. 8a rotates the hub 26 and the sector 126 fixed thereto. The sector 126 (Figs. 22, 24, 25) acts on the L-shaped end 227a of the lever 127a secured to the adjacent hub 28a, thereby rotating said hub 28a; the further hubs 28b, 28c are rotated through the same angle as the hub 28a, by the action of the ends 328a, 328b (Fig. 22) of the toothed sectors 27*a*, 27*b* engaging the projections 227*b*, 227*c*, respectively, on the hubs 28*b*, 28*c*.

Rotation of the shaft 17 causes toothed sectors 27*a*, 27*b*, 27*c* to engage with the toothed wheels 23*a*, 23*b*, 23*c*, said shaft rotating further to advance by one step all the change-indicating drums *7a*, *7b*, *7c*. When rotation of the shaft 17 in the direction of the upper arrow of Fig. 8*a* stops, the change indicating drums *7a*, *7b*, *7c* are in the position indicated as step *b* of the change-indicating operation.

During the above-described rotation of shaft 17, the return springs 55 fixed to the end 128 of the toothed sectors 27*a*, 27*b*, 27*c* are tensioned.

At a next step the shaft 17 is rotated by the prime mover of the cash register in an opposite direction. This rotation does not lead to the return of toothed sectors 27*a*, 27*b*, 27*c* to their original position because the toothed sectors 27*a*, 27*b*, 27*c* are rotatably mounted on the shaft 17. The return of sectors 27*a*, 27*b*, 27*c* to their starting position or their further engagement with the toothed wheels 23*a*, 23*b*, 23*c* is dependent upon the position (Figs. 8*a*, 8*b*) of the member 32*a* (32*b*, 32*c*) secured to the feeler member 30 (31*a*, 31*b*) with respect to the notches 231*a* (231*b*, 231*c*) in the member 127*a* (127*b*, 127*c*) as will be hereinafter explained, as well as upon the engagement of the L-shaped member 227*c* and 227*b* with the rear part 328*b* and 328*a* of the toothed sector 27*b* and 27*a*, respectively.

*Transfer-engaging shaft*

The transfer-engaging shaft 18 (Fig. 25) is mounted on the side walls 12, 13 rotatable on two bearings 16. Transfer shaft 18 is rotated through an angle by the prime mover of the cash register through means not shown in the drawing. Three hubs 51, 52, 53 (Figs. 25, 7*a*, 7*b*) are mounted on the shaft 17, said hubs being rotatable with respect to said shaft. The said hubs equal in number the change-indicating drums less one, and equal in number the one-tooth wheels 24, 25*a*, 25*b* fixed to said drums.

Each hub 51, 52, 53 is formed with a radial slot (Figs. 7*a*, 7*b*, 25) of a limited angular width, a split pin 44 secured to the shaft 18 being seated in said slot.

Each hub 51, 52, 53 has fixed thereto a feeler member 30, 31*a*, 31*b*, a side projection 32*a*, 32*b*, 32*c* perpendicular to the feeler member, and a further member 33 to which the end of a spring 36 is fixed, the other end of said spring being fixed to the shaft 19. The action of the spring 36 is such as to push the feeler members 30, 31*a*, 31*b* towards the one-tooth wheel 24, 25*a*, 25*b*, respectively (Figs. 7*a*, 7*b*).

In the drawing, Fig. 25, the feeler members 30, 31*a*, 31*b* are interrupted for the sake of clearness.

Upon performing the setting operation of the cash register, the feeler member 30, 31*a*, 31*b* and corresponding one-tooth wheel 24, 25*a*, 25*b* can take two different relative positions, that is:

(1) The position indicated in Fig. 7*a* for the feeler member 31*b* and corresponding one-tooth wheel 25*b* in which the feeler member 31*b* (30, 31*a* respectively) contacts, by the action of the spring 36, the tooth of the one-tooth wheel 25*b* (24, 28*a* respectively);

(2) The position indicated in Fig. 7*b* for the feeler member 31*b* (30, 31*a* respectively) and one-tooth wheel 25*b* (24, 25*a* respectively) in which the end of the feeler member 31*b* (30, 31*a* respectively) contacts the lowered portion of the one-tooth wheel 25*b* (24, 25*a* respectively).

The position indicated under 1 is taken when no figure other than zero is carried on the change-indicating drum *7b* (*7'*, *7a* respectively), at the end of the setting operation of the cash register. The position indicated under 2 is taken when a figure other than zero is carried on the change-indicating drum *7b* (*7'*, *7a* respectively), at the end of the setting operation of the cash register.

Figs. 8*a* and 8*b*, respectively, show the relative position of the projection 32*a* (32*b*, 32*c*) on the hub 51 (52, 53 respectively) and the member 127*a* (127*b*, 127*c* respectively). With the arrangement indicated under 1 corresponding to Fig. 8*a*, the toothed sector 27*a* can rotate in the direction of either the upper or lower arrow, Fig. 8*a*. In the arrangement of Fig. 8*b*, the toothed sector 27*a* can rotate in direction of the upper arrow of Fig. 8*a* only and not in the opposite direction.

Consequently, should the feeler member 31*b* be in the position of Fig. 7*b*, the corresponding toothed sector 27*a* can rotate in clockwise direction but not in the opposite direction (Fig. 8*b*). Should the feeler member 31*b* and one-tooth wheel 25*b* be in the position indicated in Fig. 7*a*, the toothed member 27*a* can rotate in both directions indicated in Fig. 8*a*.

Should the feeler member 31*b* (31*a*, 30) be in the position indicated in 7*a*, the change-indicating drum *7c* (*7b*, *7a*) can rotate by one step in the direction of the lower and upper arrows, as indicated in Fig. 8*a*, while, should the feeler 31*b* be in the position indicated in Fig. 7*b*, the drum can rotate through one step only in the direction of the upper arrow (Fig. 8*a*).

It should be considered that if a toothed sector, 27*a* for instance, after rotation in the direction of the upper arrow of Fig. 8*a*, cannot rotate in the opposite direction on account of the relative position of the members 32*a* and 127*a* shown in Fig. 8*b*, none of the toothed sectors on the left of 27*a*, that is, 27*b* and 27*c*, can rotate in the direction of said lower arrow. This is due to the fact that the projection, Fig. 6*c*, 328*a* (328*b*) of the sector 27*a* (27*b*) cooperates with the projection 227*b* (227*c*) on the hub 28*b* (28*c*), preventing any rotation of the sectors 27*b* and 27*c* in the direction of the lower arrow in Fig. 8*a*. As a consequence, the change-indicating drums *7b*, *7c* past the first drum *7a*, for instance, on which a figure other than zero has been set, cannot return to the initially set position owing to the fact that the toothed sector 27*b*, 27*c* is engaged with the corresponding wheel 23*b*, 23*c*.

In a fresh operation of the apparatus, rotation of the shaft 18 driven by the prime mover of the cash register displaces the feelers 30, 31*a*, 31*b* by means of pins 44 sliding in the slots 51*a*, 52*a*, 53*a* of hubs 51, 52, 53 (Figs. 25, 7*a*, 7*b*), from the position of Fig. 6*c* to the position of Fig. 6*a*, release of the feelers 30, 31a, 31*b* bringing the projections 32*a*, 32*b*, 32*c* from the position indicated in Fig. 8*b* to the position indicated in Fig. 8*a*. The toothed sectors 27*a*, 27*b*, 27*c* are consequently disengaged from the toothed wheels 23*a*, 23*b*, 23*c*, respectively, and are returned by spring 55 to their starting positions.

*Operation of the machine*

Operation of the machine in three stages for indicating the change is hereinafter explained for the disclosed machine, that is, for a machine suitable for the normal currency (10,000—5000—1000—500—100—50) in which the drums *7a*, *7b*, *7c* past the drum *7'* carry both the complements to ten and the complements to five.

Operation of the machine is explained with reference to four separate examples of amount cashed, that is 470—765—3300—4010. In this manner all the possible operations of the machine will be clear.

1ST EXAMPLE. AMOUNT CASHED 470

*Step A. Setting operation.*—During the setting operation the toothed sectors 27*a*, 27*b*, 27*c* are disengaged from the toothed wheels 23*a*, 23*b*, 23*c* (Figs. 6*a* and 25). Upon setting on the cash register the amount 4 7 0 the change-indicating drums *7c*, *7b*, *7a*, *7'* indicate through the set of gears described (Fig. 5) at the positions beneath the reading openings the complements to the figures of the amount 0 (5) | 6 (1) | 3 ( ) | 0

The bracketed figures indicate the figures on the column of the complements to five.

At the end of this step,

*a.* No figure other than zero has been set on the drum 7′. Consequently (Fig. 25), the feeler member 30 and the one-tooth wheel 24 are in the relative position shown for **31*b* and 25*b***, respectively, in Fig. 7*a*.

The member **32*a* rigidly connected to feeler member 30, is arranged with respect to the member 127*a*** in the position shown in Fig. 8*a*. As a consequence, toothed sector **27*a*** can rotate in the direction of the upper and lower arrow of Fig. 8*a*.

*b.* A figure other than zero has been set on drum **7*a*. Feeler member 31*a* and one-tooth wheel 25*a*** are in the position shown in Fig. 7*b* for **31*b* and 25*b* respectively, and contact under the action of the spring 36. The member 32*b*, rigidly connected to feeler member 31*a*, is arranged with respect to the member 127*b*** in the position shown in Fig. 8*b* for **32*a* and 127*a*, respectively. As a consequence, the toothed sector 27*b*** can rotate in the direction of the arrow of Fig. 8*b* only.

*c.* A figure other than zero has been set on drum **7*b*. The feeler member 31*b* and one-tooth wheel 25*b*** are in the position shown in Fig. 7*b*. The member **32*c*, rigidly connected to feeler member 31*b*, is arranged with respect to the member 127*c*** in the position shown in Fig. 8*b* for **32*a* and 127*a* respectively. Moreover, the projection 227*b* connected to the toothed sector 27*b* engages the end 328*a*** (Fig. 6*c*) of the sector **27*a* preventing any rotation of sector 27*b* in the direction forbidden for 27*a*. As a consequence, the toothed sector 27*c*** can rotate in the direction of the arrow of Fig. 8*b* only.

*d.* No figure has been set on the last drum **7*c*. The sector 27*c* is disengaged at this step from the toothed wheel 23*c*. The sector 27*c*** can rotate in the direction of the upper arrow of Fig. 8*a* but not in an opposite direction for the engagement between the projection **227*c* and the end 328*b* of the toothed sector 27*b* which keeps the sector 27*c* against any movement from which the sector 27*b*** is prevented.

*Step B. Rotation of the shaft 17.*—After the end of the setting operation, shaft 17 is rotated by the prime mover of the cash register in the direction of the upper arrow of Fig. 8*a*. Rotation is transmitted to the toothed sectors **27*a*, 27*b*, 27*c* by the lever 126 which is keyed on shaft 17 and rotates sector 27*a* through the engagement between said lever and the L-shaped projection 227*a*. The sector 27*b* is rotated by the engagement between the rear portion 328*a* of the toothed sector 27*a* and projection 227*b*; toothed sector 27*c* is similarly rotated by the engagement between the rear portion 328*b* of the sector 27*b* and projection 227*c***.

Rotation of the shaft 17 in the direction of the upper arrow of Fig. 8*a* tensions the springs 55 connected to the toothed sectors **27*a*, 27*b*, 27*c***.

Rotation of the shaft 17 causes the toothed sectors **27*a*, 27*b*, 27*c* to engage with toothed wheels 8*a*, 8*b*, 8*c* and advance the change-indicating drums 7*a*, 7*b*, 7*c* through one step. At the end of this rotation of shaft 17**, the figures which appear on the change-indicating drums at the positions corresponding to the reading openings are 9 (4) | 5 ( ) | 2 ( ) | 0

At the end of this step:

*a.* The member **32*a* and member 127*a*** are in the position shown in Fig. 8*a*, in which the member **32*a* does not prevent rotation of the toothed sector 27*a*** in the direction of the lower arrow of Fig. 8*a* (said rotation is prevented at this step by the action of the lever 126 keyed on the shaft 17 with the projection **227*a* rigidly connected to the toothed sector 27*a***).

*b.* The member **32*b* and member 127*b* are in the position shown for 32*a* and 127*a***, respectively, in Fig. 8*b*. The projection **227*b* engages the rear portion 328*a* of sector 28*a***.

*c.* The projection **227*c* connected to the sector 27*c* engages the rear portion 328*b* of sector 28*b***.

*d.* Spring 55 are tensioned.

*Step C. Second rotation of the shaft 17.*—The shaft 17 is rotated by the prime mover of the cash register in the direction of the lower arrow of Fig. 8*a* and is returned to its starting position. The toothed sectors **27*a*, 27*b*, 27*c* are under the action of springs 55**.

In this step:

*a.* Toothed sector **27*a*** can rotate in the direction of the lower arrow of Fig. 8*a* (**32*a* and 127*a*** are in the position shown in Fig. 8*a*). Drum **7*a* is returned to the position prior to the first rotation of shaft 17**.

*b.* Toothed sector **27*b*** cannot rotate in the direction of the lower arrow of Fig. 8*a* (**32*b* and 127*b* are in the position shown for 32*a* and 127*a***, respectively, in Fig. 8*b*). Drum **7*a* remains in the position taken after the first rotation of shaft 17**.

*c.* Toothed sector **27*c*** cannot rotate in the direction of the lower arrow of Fig. 8*a* owing to engagement between the rear portion **328*b* of the sector 28*b* and projection 227*c* secured to toothed sector 27*c*. Drum 7*c* remains in the position taken after the first rotation of shaft 17**.

At the end of Step C, the change-indicating drums **7*c*, 7*b*, 7*a*, 7′** indicate:

| | | | | |
|---|---|---|---|---|
| | 9 (4) | 5 (0) | 3 ( ) | 0 |
| The number … is the change to 10,000. | 9 | 5 | 3 | 0 |
| The number … is the change to 5000. | 4 | 5 | 3 | 0 |
| The number … is the change to 1000. | | 5 | 8 | 0 |
| The number … is the change to 500. | | | 3 | 0 |

2ND EXAMPLE. AMOUNT CASHED 765

*Step A. Setting operation.*—Upon performing the setting operation, at the position beneath the reading openings, the change-indicating drums **7*c*, 7*b*, 7*a*, 7′** indicate:

0 (5) | 3 ( ) | 4 ( ) | 5

At the end of this step:

*a.* The feeler member 30 and one-tooth wheel 24 are in the relative position shown for **31*b* and 25*b***, respectively, in Fig. 7*b*, in which the end of the feeler member contacts, by the action of the spring 36, the lowered portion of the one-tooth wheel 24. The member **32*a* rigidly connected to feeler member 30 is arranged with respect to the member 127*a*** in the position shown in Fig. 8*b*. As a consequence, toothed sector **27*a*** can rotate in the direction of the upper arrow of Fig. 7*a* only.

*b.* The toothed sector **27*b*** can rotate in the direction of the arrow of Fig. 8*b* only, for the reason explained in connection with the corresponding step of the first example. It should, moreover, be noted that rotation of sector **27*b*** in the direction of the lower arrow of Fig. 8*a* is prevented by the engagement between the projection **227*b*, rigidly connected with the sector 27*b*, and the rear end 327*a* of sector 27*a*, which prevents any rotation of the sector 27*b* in a direction forbidden to 27*a***.

*c.* The toothed sector **27*c*** can rotate only in the direction of the arrow of Fig. 8*b* because of the engagement between the projection **227*c* and end 328*b* of the toothed sector 27*b*, which keeps the sector 27*c* against any rotation from which the sector 27*b*** is prevented.

*Step B. Rotation of the shaft 17.*—At the end of this rotation, the figures appearing on the change-indicating drums at the positions corresponding to the reading openings are 9 (4) | 2 ( ) | 3 ( ) | 5

At the end of this step:

*a.* The member **32*a* and member 127*a*** are in the position shown in Fig. 8*b*, any rotation of the sector 27*a* in the direction of the lower arrow of Fig. 8*a* being prevented, *b*—*c*—*d* are similar to the corresponding part of the first example.

*Step C. Second rotation of the shaft 17.*—As explained in Step B, the toothed sectors 27*a*, 27*b*, 27*c* cannot rotate in the direction of the lower arrow of Fig. 8*a*. Consequently, rotation of the shaft 17 to its starting position does not displace the indicating drums 7*a*, 7*b*, 7*c* from the position taken at the end of Step B.

At the end of this step, the change-indicating drums 7*c*, 7*b*, 7*a*, 7′ indicate:

9 (4) | 2 ( ) | 3 ( ) | 5

The number 9 2 3 5 is the change to 10,000.

The number 4 2 3 5 is the change to 5000.

The number 2 3 5 s the change to 1000.

3RD EXAMPLE. AMOUNT PAID 3300

*Step A. Setting operation.*—Upon performing the setting operation at the position beneath the reading openings, the change-indicating drums 7*c*, 7*b*, 7*a*, 7′ indicate:

7 (2) | 7 (2) | 0 (5) | 0

At the end of this step:

*a.* Toothed sector **27*a*** can rotate in the direction of both the upper and lower arrows of Fig. 8*a* for the reasons explained at the corresponding part of the first example.

*b.* No figure other than zero has been set on the drum 7*b*. Consequently, the feeler member 31*a* and the one-tooth wheel 25*a* are in their relative positions shown for 31*b* and 25*b* in Fig. 7*a*. The member 32*b*, rigidly connected to feeler member 31*a* is arranged with respect to member 127*b* in the position shown for 32*a* and 127*a*, respectively, in Fig. 8*a*. As a consequence, toothed sector 27*b* can rotate in the direction of both the upper and lower arrows of Fig. 8*a*.

*c.* A figure other than zero has been set on the drum 7*b*. Feeler member 31*b* and one-tooth wheel 25*b* are in the position shown in Fig. 7*b*. The member 32*c*, rigidly connected to feeler member 31*b*, is arranged with respect to the member 127*c* in the position shown in Fig. 8*b* for the 32a and 127*a*, respectively. As a consequence, the toothed sector **27*c*** can rotate in the direction of the arrow of Fig. 8*b* only.

*d.* A figure other than zero has been set on the drum 7*c*. The sector **27*c*** is disengaged at this step from the toothed wheel 23*c* and can rotate in the direction of the arrow of Fig. 8*b* only owing to engagement between the projection **227*c* and the end 328*b* of the toothed sector 27*b*, which prevents the sector 27*c*** from performing any movement against which the sector 27*b* is prevented.

*Step B. Rotation of the shaft 17.*—At the end of this rotation, the figures which appear on the change-indicating drums at the positions corresponding to the reading openings are 6 (1) | 6 (1) | 9 (4) | 0

At the end of this step:

*a.* The members **32*a* and 127*a*** are in the positions shown in Fig. 8*a*; the sector **27*a*** can rotate in the direction of the upper and lower arrows of Fig. 8*a*.

*b.* The members **32*b* and 127*b*** are in the position shown in Fig. 8*a* and the sector **27*b*** can rotate in the direction of the upper and lower arrows of Fig. 8*a*.

*c.* The members **32*c* and 127*c*** are in the relative positions shown in Fig. 8*b*. Consequently, the sector **27*c*** can rotate in the direction of the arrow of Fig. 8*b* only.

*Step C. Second rotation of the shaft 17.*—In this step:

*a.* Toothed sectors **27*a*, 27*b*** rotate in the direction of the lower arrow of Fig. 8*a*. Drums 7*a* and 7*b* are returned to the position prior to the first rotation of shaft 17.

*b.* Toothed sector **27*c*** is prevented from rotating in the direction of the lower arrow of Fig. 8*a*. Drum 7*c* remains in the position taken after the end of the first rotation of shaft 17.

At the end of Step C, the change-indicating drums 7*c*, 7*b*, 7*a*, 7′ indicate at the positions corresponding to the reading openings:

6 (1) | 7 (2) | 0 (5) | 0

The number 6 7 0 0 is the change to 10,000.

The number 1 7 0 0 is the change to 5000.

4TH EXAMPLE. AMOUNT CASHED 4010

*Step A. Setting operation.*—Upon performing the setting operation at the positions underneath the reading openings, the change-indicating drums 7*c*, 7*b*, 7*a*, 7′ indicate:

6 (1) | 0 (5) | 9 (4) | 0

At the end of this step:

*a.* Toothed sector **27*a*** can rotate in the direction of both the upper and lower arrows of Fig. 8*a*, for the reasons explained in the corresponding part of the first example.

*b.* Toothed sector **27*b*** can rotate in the direction of the upper arrow of Fig. 8*a* only for the reasons explained in the corresponding part of the first example.

*c.* No figure other than zero is carried on the drum **7*b*. Consequently, the feeler 31b and the one-tooth wheel 25*b*** are in the position indicated in Fig. 7*a*, the member **32*c* and the member 127*c*** being in the position shown in Fig. 8*a* for **32*a* and 127*a*, respectively. The toothed sector 27*b***, however, can rotate in the direction of the upper arrow of Fig. 8*a* only, owing to the engagement between the projection **227*b* and rear part 328*a*** of toothed sector 27*a* which prevents the toothed sector 27*b* from performing any rotation forbidden to toothed sector 27*a*.

*d.* The toothed sector **27*c*** can rotate in the direction of the upper arrow of Fig. 8*a* only for the reasons explained in the corresponding part of the first example.

*Step B. Rotation of the shaft 17.*—At the end of this rotation, the figures which appear on the change-indicating drums at the position corresponding to the reading openings are:

5 ( ) | 9 (4) | 8 (3) | 0

At the end of this step:

*a.* The member **32*a* and member 127*a*** are in the position shown in Fig. 8*a*.

*b.* The member **32*b* and member 127*b* are in the position shown for 32*a* and 127*a***, respectively, in Fig. 8*b*. Rotation of the toothed sector **27*a*** in the direction of the lower arrow of Fig. 8*a* is prevented.

*c.* The member **32*c* and member 127*c*** are in the position shown in Fig. 8*a*. Any rotation of the toothed sector 27*b* in the direction of the lower arrow of Fig. 8*a* is prevented by the engagement between the projection **227*b* and rear part 328*a* of the toothed sector 28*a***.

*d.* The sector **27*c*** cannot rotate in the direction of the lower arrow of Fig. 8*a* in view of the engagement between the projection **227*c* and rear part 328*b* of sector 27*b*, which engagement prevents any rotation of the sector 27*c* forbidden to the sector 27*c***.

*Step C. Second rotation of the shaft 17.*—In this step, toothed sector 27*a* can rotate in the direction of the lower arrow of Fig. 8*a*. Said rotation is prevented to sectors 27*b* and 27*c*.

At the end of Step C, the figures which appear on the change-indicating drums at the positions corresponding to the reading openings are 5 ( ) | 9 (4) | 9 (4) | 0

The number 5 9 9 0 is the change to 10,000.

The number 9 9 0 is the change to 5000.

*Device for reading the change*

The drums 7, 7' are arranged in front of normally closed openings 70, 71, 72, 73 (Fig. 1). The three openings on the left, corresponding to the positions referred to above as "reading positions" for the change-indicating drums, are closed by two screens, each of which conceals half the opening; the right-hand opening 70 is closed by one screen only.

The screens cover the openings both during the setting operation and during actuation of the cash register. The drums are readable through said openings when the movement of the prime mover of the cash register has stopped, by operating a key corresponding to the coin paid.

The change-calculating device is provided with a number of setting members equalling the number of the different coins or banknotes in the particular currency employed. For the Italian currency, six setting members corresponding to 50, 100, 500, 1000, 5000, 10,000 are employed.

The keys corresponding to the values of the coin paid lower the screens covering the columns of the change-indicating drums in which the complements of the cashed amount to the particular coin set appear. Figs. 9 to 14 show in a merely diagrammatical manner the screens to be lowered for each particular coin set, the screens to be lowered in order to uncover the column of the change-indicating drums are indicated in dot-and-dash lines, and the corresponding setting member is indicated by the value of the coin and an arrow.

The mechanical device for uncovering the openings through which the columns of the change-indicating drums are read is composed of screens slidable in a plane and operated by keys which are likewise slidable in the same plane.

Figure 2:
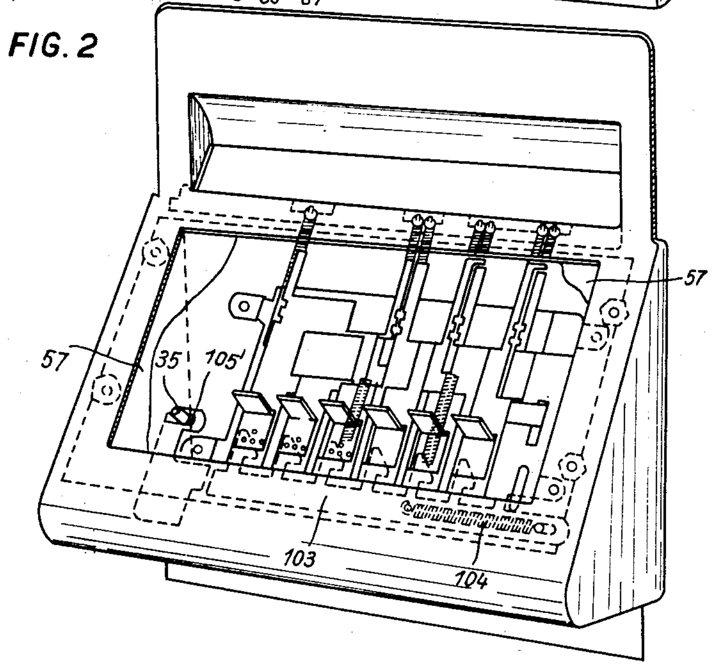
Fig. 2 shows a front perspective view of the change-calculating device, the front cover having been removed in order to show the inner apparatus.

The device for opening the screens is formed by an upper plate 57 which has been partially removed in Fig. 2. Four openings 70, 71, 72, 73 (Figs. 1, 9–14) are bored in said plate, through which the columns of the change-indicating drums appear; six slots 74, 75, 76, 77, 78, 79 are also cut in said plate, in which the keys 87, 88, 89, 90, 91, 92 corresponding to the different coins set slide. A further slot 105' (Fig. 2) perpendicular to the previously-mentioned openings permits movement of the member-actuating release of the key associated with the particular coin set.

The lower part of the device is formed by a plate 58 parallel with plate 57 and formed with seven openings 80, 81, 82, 83, 84, 85, 86 (Figs. 15–18) through which the columns of the change-indicating drums appear.

The slidable screens are placed between the two plates 57 and 58 and are slidable in a plane parallel to said plates. Said screens are movable in seats which are not shown in the drawings for the sake of simplicity.

Figs. 15 to 20 show the plate 58 and screen for each particular coin; the openings to be uncovered for each particular coin are indicated in full lines and the openings which remain covered are indicated in dotted lines. The screens are shown in the position in which the openings through which the figures of the change appear are uncovered.

For the sake of simplicity, Figs. 15 to 20 merely show the set of screens associated to the columns in which the figures of the change corresponding to the coin set appear.

The screens covering the openings and sliding plates on which the keys for the different coins are fixed can move in one direction only, that is, in the direction corresponding to the vertical side of the drawings. The guides for preventing any lateral displacement of said screens are an obvious arrangement, and are not disclosed in the drawings for the sake of simplicity.

*Coin 50 (Figs. 9–15a)*

The opening 80, corresponding to the opening 70 and the drum 7', and the opening 81, corresponding to the right half of opening 71 and to the column of the complements to five in the drum 7*a*, should be opened.

Lowering of the key 87 causes the plate 93 to slide downwardly; said plate 93 is formed with a portion 93*a* serving as a screen for the opening 81. Plate 93 is provided with an upper guide member 93*b* which ends in a perpendicular projection 93*c*.

Open 80 is covered in normal conditions by a screen 94*a* which is formed in a plate provided with upper and lower guide members 94*b*, 94*c*. The perpendicular projection 93*c* of plate 93 engages during lowering the upper end of guide member 94*c*, thereby uncovering the opening 80.

Plates 93 and 94 are urged to their starting positions by return springs which are indicated by the common reference M. One end of the spring M is fixed to a projection on the plates 93, 94, its opposite end being fixed to pins secured to the walls of the cash register.

*Coin 100 (Figs. 10, 16, 16a)*

The openings 80 and 82, corresponding to the openings 70 (change drum 7') and to the left half of openings 71 (column of the complement to ten in the change drum 7*a*), should be opened. The opening 82 is normally covered by the screen 95*a* formed in the plate 95, which is guided by two end projections 95*b*, 95*c*. Said plate is also formed with a side projection 95*d*.

Lowering of the key 88 associated with the coin 100 lowers the plate 96, the upper end 96*a* of which is perpendicular to the plate 96 and engages an edge of the plate 95, causing said plate to lower.

The side projection 95*d* of plate 95 engages on lowering a side projection 94*d* on plate 94, causing the latter to slide and uncover the opening 80.

*Coin 500 (Figs. 11, 17)*

The openings 80, 82, 83 should be opened, said openings corresponding to the opening 70, the left half of opening 71, the right half of opening 72, and to the change-indicating drum 7', the column of the complements to ten on the change-indicating drum of the tens 7*a*, and the column of the complements to five on the change-indicating drum of the hundreds 7*b*.

The opening 83 is normally covered by the screen 97*a*. Lowering of the key 89 associated with the coin 500 lowers the plate 97 which is formed with an upper portion 97*a* acting as a screen for the opening 83. The plate 97 is guided by an upper member 97*b* ending by an upper perpendicular projection 97*c*. Said upper perpendicular projection 97*c* engages on lowering the guide member 95*c* of plate 95, thereby lowering said plate and uncovering the opening 82.

Lowering of plate 95 displaces downwardly the screen 94*a* in the plate 94 and consequently uncovers the opening 80, as previously disclosed (coin 100).

*Coin 1000 (Figs. 12, 18, 18a)*

The openings 80, 82, 84 should be opened, said openings corresponding to the opening 70, the left half of opening 71, the left half of opening 72, and to change-indicating drum 7' of the units, the column of the complements to ten in the change-indicating drum 7a of the tens, and the column of the complements to ten in the change-indicating drums 7b of the hundreds.

Lowering of the key 90 secured to the sliding plate 98 lowers said plate, which is provided with an upper perpendicular projection 98a engaging an edge of the plate 99 with consequent lowering of said plate.

The plate 99 is guided by two end projections 99b and 99c and is formed with a portion 99a operating as a screen for the opening 84. Lowering of the key 90 lowers the screen 99a, thereby uncovering the opening 84.

The plate 99 is formed with a side projection 99d engaging a projection 95e on the plate 95. Lowering of plate 99 causes the plate 95 to lower and consequently uncovers the opening 82.

Lowering of the plate 95 lowers the plate 94 and consequently uncovers the opening 80, as previously described (coin 100).

*Coin 5000 (Figs. 13, 19)*

The openings 80, 82, 84, 85 should be opened, said openings corresponding to the opening 70, the left half of opening 71, the left half of opening 72, the right half of opening 73 and to the change-indicating drum 7' of the units, the column of the complements to ten in the change-indicating drum 7a of the tens, the column of the complements to ten in the change-indicating drum 7b of the hundreds, and the column of the complements to five in the change-indicating drum 7c of the thousands.

Lowering of the key 91 secured to the plate 100 lowers said plate. The plate 100 is formed with a guide member 100b ending with an upper perpendicular projection 100c, and is also formed with a member 100a acting as a screen for the opening 85.

The upper perpendicular projection 100c engages on lowering the guide member 99c on the plate 99, thereby uncovering the opening 84.

The downward movement of plate 99 lowers the plates 95 and 94 and uncovers the openings 82 and 80, as previously described (coin 1000).

*Coin 10,000 (Figs. 14, 20)*

The openings 80, 82, 84, 86 should be opened, said opening corresponding to the opening 70, the left half of the opening 71, the left half of opening 72, and the left half of openings 73, and to the change-indicating drum of the units, the column of the complements to ten in the change-indicating drum 7' of the units, the column of the complements to ten in the change-indicating drum 7a of the tens, the column of the complements to ten in the change-indicating drum 7b of the hundreds, and the column of the complements to ten in the change-indicating drum 7c of the thousands.

The key 92 is secured to the plate 101, which is formed with an upper guide member 101b. The plate 101 is provided with a side projection 101a acting as a screen for the opening 86, so that lowering of the key 92 uncovers the opening 86. The plate 101 is also provided with a side projection 101c which engages a side projection 99e on the plate 99, thereby uncovering the opening 94.

Downward movement of plate 99 displaces the plates 95 and 94 uncovering the openings 82, 80, as previously explained (coin 1,000).

As previously explained, the plates covering the opening through which the change-indicating drums appear are upwardly urged by springs M. However, by setting a key corresponding to a coin, the plates covering the columns of the drums on which the figures of the change appear are held opened. The device is shown in Figs. 21a, 21b, and operates as follows:

The plate 57 has fixed thereto two pins 102a, 102b and a member 103 provided with projections 105 equalling in number the coins set. Said member 103 is formed with two slots 103a, 103b engaging the pins 102a, 103b. Each plate corresponding to a coin set has fixed to its rear face a pin 104 which, before setting of the coin, is in the position shown in Fig. 21a (for the sake of simplicity, Figs. 21a, 21b indicate one setting plate only).

During setting of the coin, the pin 104 slides along the inclined edge of projection 105, and when the coin is set, said pin is engaged, as shown in Fig. 21b by the action of spring M on the member 103. Return of the plate corresponding to the coin set to its starting position is effected by displacing the upper pin 35 to the left.

*Conclusions*

The column of the drum 7' (units) (Figs. 15–20) appears through the opening 80. The column of the complements to ten of the drum 7a (tens) appears through the opening 82, and the column of the complements to five appears through the opening 81. The column of the complements to ten of the drum 7b (hundreds) appears through the opening 84, and the column of the complements to 5 appears through the opening 83. The column of the complements to ten of the drum 7c (thousands) appears through the opening 86, and the column of the complements to five appears through the opening 85.

Lowering of the keys corresponding to the currency uncovers the openings through which the change corresponding to the particular currency can be read in the manner described for each currency.

What I claim is:

1. In a cash register having units and tens indicating drums, a change indicating mechanism comprising: a units of change indicating drum coupled for rotation with the units indicating drum thereby to display a complement to ten of a digit displayed by the units indicating drum; a tens of change indicating drum resiliently coupled for rotation with the tens indicating drum thereby to display a complement to ten of a digit displayed by the tens indicating drum but whereby the tens of change indicating drum may be angularly advanced to a complement-to-nine indicating position with respect of the tens indicating drum; a toothed wheel fast with the tens of change indicating drum; a transfer shaft; a toothed sector rotatable on the transfer shaft adapted to mesh with the said toothed wheel; spring means urging the sector out of mesh with the toothed wheel; a lever keyed on the transfer shaft capable of engaging the toothed sector on a rotation of the shaft in one direction thereby to cause the sector to mesh with the toothed wheel and angularly advance the tens of change indicating drum to the said complement-to-nine indicating position, and of disengaging the sector on rotation of the shaft in opposite direction; and means sensitive to non-zero indicating position of the units indicating drum capable of locking the sector and tens of change indicating drum in the said complement-to-nine indicating position when the units of change indicating drum displays a digit different from zero, and of leaving the sector and the tens of change indicating drum free to return to the complement-to-ten indicating position of the drum and disengaged condition of the sector when the units of change indicating drum displays zero and the transfer shaft is rotated in the said opposite direction to disengage the sector from the lever.

2. In a cash register as claimed in claim 1, the said means sensitive to zero indicating position of the units indicating drum comprising: a one-tooth wheel fast in rotation with the units of change indicating drum; a shaft; a feeler lever in a lost-motion driving engagement with the shaft and having a feeler end portion capable of protruding into the path of the tooth on the one-tooth wheel; a spring urging the feeler end portion of the lever towards the periphery of the wheel; a projection fast with the toothed sector; and a projection on the feeler lever capable of engaging and disengaging the first-named projection when the feeler end portion is disengaged and engaged respectively from the said tooth.

3. A cash register as claimed in claim 1, comprising a first slidable shutter associated with the units of change indicating drum, a second slidable shutter associated with the tens of change indicating drum, spring means urging the shutters into closed position, a nose on each shutter for manual actuation thereof into open position, and a projection on the said second shutter capable of pushing the said first shutter into open position on manual actuation of the said second shutter.

4. In a cash register as claimed in claim 1, a hundreds indicating drum operatively associated with the tens and units indicating drums; a hundreds of change indicating drum resiliently coupled for rotation with the hundreds indicating drum thereby to display a complement to ten of a digit displayed by the hundreds indicating drum but whereby the hundreds of change indicating drum may be angularly advanced to a complement-to-nine indicating position with respect of the hundreds indicating drum; a toothed wheel fast with the hundreds of change indicating drum; a further toothed sector rotatable on the transfer shaft adapted to mesh with the toothed wheel fast with the hundreds of change indicating drum; spring means urging the said further toothed sector out of mesh with the last-named toothed wheel; a projection on the said further toothed sector capable of being engaged from the toothed sector associated with the tens of change indicating drum on rotation of the transfer shaft in one direction thereby to cause the said further sector to mesh with the second-named toothed wheel and angularly advance the hundreds of change indicating drum to the said complement-to-nine indicating position, and of being disengaged from the toothed sector associated with the tens of change indicating drum on rotation of the transfer shaft in opposite direction; and means sensitive to non-zero indicating position of the tens-indicating drum capable of locking the said further toothed sector and the hundreds of change indicating drum in the said complement-to-nine indicating position when the tens indicating drum displays a digit different from zero, and of leaving the said further sector and the hundreds of change indicating drum free to return to the complement-to-ten indicating position when the tens indicating drum displays zero and the transfer shaft is rotated in the said opposite direction to disengage the said further sector from the sector associated with the tens of change indicating drum.

5. In a cash register as claimed in claim 4, a resilient coupling between the tens indicating drum and the tens of change indicating drum including a driven member fast with the tens of change indicating drum, a driving member fixedly geared to the tens indicating drum whereby the angular position of the driving member is fixedly related to the angular position of the tens indicating drum, and a resilient member connecting the driven and driving members; and the said means sensitive to zero indicating position of the tens indicating drum comprising: a one-tooth wheel fast in rotation with the driving member of the coupling, a shaft, a feeler lever in a lost motion driving engagement with the shaft and having a feeler end portion capable of protruding into the path of the tooth on the one-tooth wheel, a spring urging the feeler end portion of the lever towards the periphery of the wheel, a projection fast with the said further toothed sector, and a projection on the feeler lever capable of engaging and disengaging the first-named projection when the feeler end portion is disengaged and engaged respectively from the said tooth.

References Cited in the file of this patent

UNITED STATES PATENTS

| | | |
|---|---|---|
| 864,185 | Osborn | Aug. 27, 1907 |
| 1,048,861 | Muzzy | Dec. 31, 1912 |
| 1,122,489 | Fuller | Dec. 29, 1914 |
| 1,142,079 | Cleal | June 8, 1915 |
| 1,255,567 | Peters | Feb. 5, 1918 |
| 1,653,655 | Pike | Dec. 27, 1927 |
| 2,261,242 | Fettig | Nov. 4, 1941 |
| 2,602,585 | Ellerbeck | July 8, 1952 |
| 2,624,126 | Bolognino et al. | Jan. 6, 1953 |
| 2,746,678 | Reynolds | May 22, 1956 |